United States Patent [19]
Nyfelt

[11] Patent Number: 5,675,322
[45] Date of Patent: Oct. 7, 1997

[54] CABLE BUNCH CODING DEVICE

[75] Inventor: Leif Nyfelt, Skövde, Sweden

[73] Assignee: Scarinus Development AB, Skovde, Sweden

[21] Appl. No.: 397,178

[22] PCT Filed: Jun. 2, 1993

[86] PCT No.: PCT/SE93/00491
  § 371 Date: Mar. 8, 1995
  § 102(e) Date: Mar. 8, 1995

[87] PCT Pub. No.: WO94/06142
  PCT Pub. Date: Mar. 17, 1994

[30] Foreign Application Priority Data

Sep. 9, 1992 [SE] Sweden .................. 9202600

[51] Int. Cl.$^6$ .................................. H04Q 1/00
[52] U.S. Cl. ..................... 340/825.31; 439/502
[58] Field of Search .............. 340/825.31, 825.34, 340/825.56, 825.03; 439/502

[56] References Cited

U.S. PATENT DOCUMENTS

| | | | |
|---|---|---|---|
| 4,579,407 | 4/1986 | Shimada | 439/502 |
| 4,941,845 | 7/1990 | Eppley | 439/502 |
| 4,954,101 | 9/1990 | Nelson | 439/502 |
| 5,293,013 | 3/1994 | Takahashi | 439/502 |

FOREIGN PATENT DOCUMENTS 3212128  10/1983  Germany .

Primary Examiner—Brian Zimmerman
Attorney, Agent, or Firm—Alfred J. Mangels

[57] ABSTRACT

A device for coding a cable bunch having a plurality of conductors of mutually different colors or color combinations. A first electrical connector (6) is provided on one end of the cable bunch and a second electrical connector (7) is connected to the device (8) to which the cable bunch (10) is to be connected, wherein the electrical connectors have a number of connector pins to which the conductors are connected individually. The electrical connectors when connected together are intended to transmit current or a signal from each of the conductors in the cable bunch to a predetermined connector pin in the second electrical connector. There is provided along the cable bunch (10) a locking device (11) which includes a code unit (12) which is constructed to break and connect one or more conductors incoming from the cable bunch (10) to the code unit (12) to the same number of conductors outgoing from the code unit. When connecting the conductors, incoming conductors (1–5) of different respective colors or color combinations are connected to outgoing conductors (1–5) of other respective colors or color combinations, thereby to obtain a predetermined mixture of colors or color combinations of the conductors (1–5) in the cable bunch (10) upstream and downstream of the code unit (12). The incoming conductors (1–5) are connected in the first electrical connector (6) to the predetermined correct connector pins with regard to the desired transmission of current or signals to the device (8). The code unit (12) is controlled by an electronic lock (13) which is constructed to cause the code unit (12) to effect the conductor connections when the user opens the electronic lock.

9 Claims, 1 Drawing Sheet

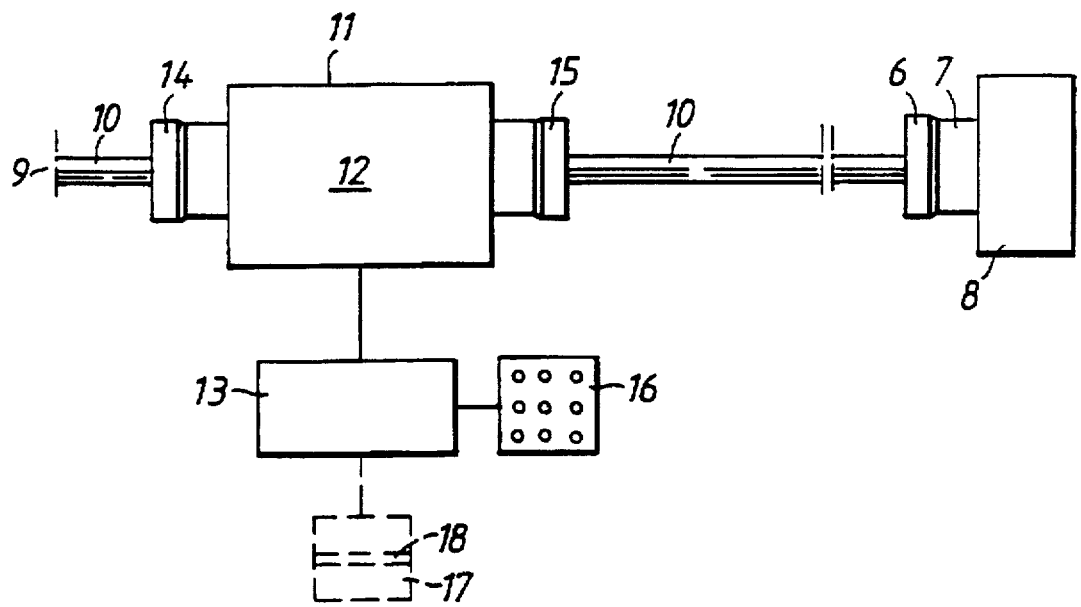
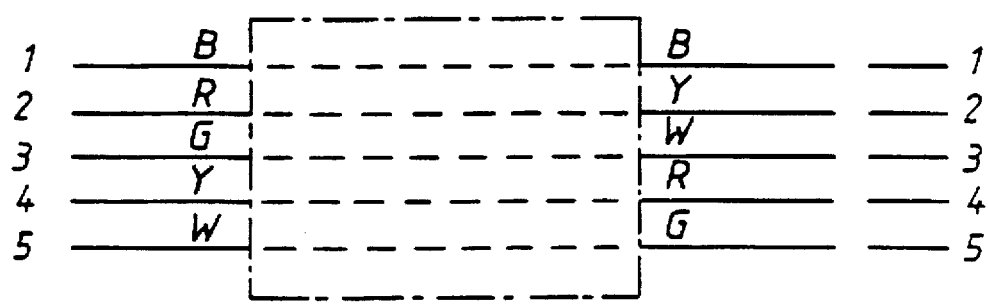

CABLE BUNCH CODING DEVICE

BACKGROUND OF THE INVENTION

1. Field of the Invention

The present invention relates to a cable bunch coding device.

2. Description of the Related Art

In different models of automotive vehicles, and also in electrical installations and electrical devices of different kinds, cable bunches are found in which the various cables or conductors are identified by different colors or color combinations.

Normally, a conductor or cable of given color shall be connected to another conductor or cable of the same color in different types of electrical connectors.

One known method of preventing unauthorized use of an automotive vehicle or an electric device is to provide the cable bunch with a locking device in the form of a key operated switch. One such example is the car ignition lock.

However, if some unauthorized person forces the lock, it is an easy matter for this person to connect together conductors of mutually the same colors and therewith bypass the lock. The conductors, or cables, are given the same colors in order for the mechanic who installs the system to be ware of how the different conductors in the cable bunch shall be connected-up. This facility, however, makes unauthorized use of the vehicle easier to achieve, simply by bypassing the lock.

SUMMARY OF THE INVENTION

This problem is solved by means of the present invention, which provides an electronic lock which renders unauthorized use of the vehicle, or electrical device, extremely difficult, if not impossible.

The present invention thus relates to a device for coding a cable bunch which includes a number of cables, or conductors, of mutually different colors or color combinations. A first electrical connector is present at one end of the cable bunch and a second electrical connector is connected to the device to which the cable bunch is to be connected. The electrical connectors have a number of connector pins to which said conductors are connected individually, said electrical connectors being intended to be connected together for transmission of electric current or an electric signal from one of the conductors in the cable bunch to a predetermined connector pin in the second electrical connector. There is provided along the cable bunch a locking device which includes a coding unit which is intended to break and mutually connect one or more conductors incoming to the coding unit with the same number of conductors outgoing from the coding unit so that, when connecting the conductors together, incoming conductors of different respective colors or color combinations are connected to outgoing conductors of other respective colors or color combinations, thereby to obtain a predetermined mixture of colors or color combinations of the conductors in the cable bunch upstream and downstream of the coding unit. The incoming conductors are connected in said first electrical connector to the predetermined correct connector pins with respect to the desired transmission of current or signals; and the coding unit is controlled by an electric lock which functions to control the coding unit in a manner to effect said conductor connection when the user opens the electronic lock.

BRIEF DESCRIPTION OF THE DRAWINGS

The invention will now be described in more detail with reference to an exemplifying embodiment thereof and also with reference to the accompanying drawing, in which FIG. 1 is a block schematic of the inventive device.

DESCRIPTION OF THE PREFERRED EMBODIMENTS

The invention is described in the following with reference to an automotive vehicle, although it will be understood that the invention is not restricted to solely this use. For instance, the invention can also be applied with cable bunches in alarm systems. Generally speaking, the invention finds application in all electrical installations where it is desired to eliminate the possibility of an unauthorized person bypassing a lock, by connecting together conductors of mutually the same color or color combinations.

FIG. 1 illustrates schematically a device for coding a cable bunch 10 which includes a plurality of cables or conductors 1–5 of mutually different colors or color combinations. The device includes a first electrical connector 6 provided on one end of the cable bunch, and a second electrical connector 7 connected to the device 8 to which the cable bunch shall be connected, said electrical connectors including a plurality of connector pins to which the cables are connected individually. The electrical connectors 6, 7 are intended to be mutually connected for the purpose of conveying current or an electric signal from each of the conductors in the cable bunch 10 to a predetermined connector pin in the second electrical connector 7.

For instance, the cable bunch 10 may be a cable bunch which is installed in a car and connected to a multiconnector of an onboard computer and which may include more than one-hundred conductors for activating different devices and for receiving signals from different signal emitters, sensors, for instance. In the illustrated case, the device 8 may therefore be the onboard computer of the vehicle, whereas the various conductors at the other end 9 of the cable bunch 10 may be drawn to different sites in the vehicle.

In accordance with the invention, there is provided along the cable bunch 10 a locking device 11 which includes a code unit 12 which functions to break and to connect one or more conductors incoming to the code unit 12 with the same number of conductors outgoing from said code unit so that when connecting the conductors, incoming conductors of different respective colors B, R, G, Y, W or color combinations are connected to outgoing conductors of other respective colors or color combinations, thereby to obtain a predetermined mixture of colors or color combinations of the conductors in the cable bunch 10 upstream and downstream of the code unit 12.

However, the conductors entering the first electrical connector 6 are connected therein to the predetermined connector pins which are correct with regard to the desired transmission of electrical current or signals.

This is illustrated in FIG. 2. The conductors are identified by reference numerals 1 to 5 on the left of FIG. 2. These conductors shall be connected to respective predetermined connector pins 1 to 5 in the first electrical connector 6, so that the correct conductors will be connected to the correct connector pins in the second electrical connector 7, so as to obtain the correct function. Thus, conductor 1 shall be connected to connector pin 1, conductor 2 to connector pin 2, and so on.

The cable bunch is conveniently connected to the code unit by means of known connector device 14, 15.

In the cable bunch upstream of the code unit, the conductor 1 is brown (B), conductor 2 is red (R), conductor 3 is green (G), conductor 4 is yellow (Y) and conductor 5 is white (W). In the cable bunch downstream of the code unit, the order is changed, however, so that a red conductor is connected to connector pin 4, a green conductor is connected to connector pin 5, a yellow conductor is connected to connector pin 2 and a white conductor is connected to connector pin 3. By way of example, one conductor, the brown conductor, has not been changed.

If the conductors upstream of the code unit are connected to conductors of the same color downstream of the code unit, only the brown conductor upstream of the code unit will be connected to the correct connector pin in the second electrical connector 7.

Thus, the red (R) incoming conductor is connected in the code unit with a yellow (Y) outgoing conductor, the green (G) incoming conductor is connected with a white (W) outgoing conductor, the yellow (Y) incoming conductor is connected with a red (R) outgoing conductor, and the white (W) incoming conductor is connected with a green (G) outgoing conductor. Naturally, all conductors can be shifted, although in the illustrated case, the brown (B) incoming conductor is connected to a similar brown (B) outgoing conductor.

The code unit 12 is constructed to connect together the various conductors in the aforesaid manner, and also to break the connection between the incoming and outgoing conductors.

According to the present invention, the code unit 12 is controlled by an electronic lock 13, which is intended to control the code unit to connect said conductors together when the user opens the electronic lock 13, and to break said connections when the electronic lock is locked. The electronic lock will conveniently include a processor which is programmed to control the code unit.

In those instances when the cable bunch is to transmit stronger currents, the code unit will include, in accordance with a preferred embodiment of the invention, relays which are controlled by the electronic lock 13. Thus, as the lock is opened the lock will activate the relays so as to effect predetermined connection of the conductors upstream and downstream of the code unit.

When weaker currents or signals are to be transmitted, the code unit will include, in accordance with one preferred embodiment of the invention, a processor which is controlled by the electronic lock 13. The processor may be of any known kind that has the requisite number of inputs and outputs and is capable of being activated by the lock in a manner to effect connection of the conductors electronically. For instance, the processor may include a number of transistor circuits which when conductive operate to effect connection of the conductors.

According to one preferred embodiment of the invention, the electronic lock 13 includes a keyboard 16 or some other device by means of which a code can be manually delivered to the electronic lock 13. The code inserted through the keyboard is compared with a code stored in the lock 13, and the electronic lock is constructed to activate the code unit in the aforesaid manner to connect said conductors together when agreement is found between the inserted code and the stored code.

The aforesaid other code insertion device may have the form of a card reader 17 provided with a slot 18 into which the card can be inserted. The card may be, for instance, of the same kind as that used for pass-checks.

The code unit is preferably constructed in a manner which renders it difficult to dismantle the unit, and preferably so that it is extremely difficult to ascertain which other conductors are connected to which conductors, by studying the contents of the unit. This is impossible when the unit contents are in the form of a processor, because information concerning the conductors to be mutually connected is divulged only by the processor software. When the code unit includes relays, it may be possible to follow the individual conductors, although very difficult to achieve in practice. In order to make this more difficult, all conductors in the code unit may have the same color.

In the aforedescribed example, four of five conductors have been mixed together. Cable bunches often contain many more conductors. In such cases, it is sufficient to intermix a few conductors, since the number of conceivable conductor combinations is extremely high.

Although the invention has been described with reference to various embodiments thereof, it will be understood that the code unit and the electric lock can be given other constructions within the scope of the knowledge of those skilled in this art while maintaining the function of the code unit and electronic lock.

The present invention shall not therefore be considered restricted to the aforedescribed and illustrated embodiments thereof, since modifications can be made within the scope of the following claims.

I claim:

1. Apparatus for preventing unauthorized manual connection of individual conductors of a multi-conductor cable with individual conductors communicating with an electrically operated device, said apparatus comprising: a cable bunch having a plurality of conductors of mutually different colors or color combinations, a first electrical connector carried on one end of the cable bunch, a second electrical connector connected to the electrically operated device to which the cable bunch is to be electrically connected, wherein the first and second electrical connectors each have a plurality of connector pins to which individual conductors are connected, and wherein the first and second electrical connectors when connected together transmit current or a signal from each of the conductors in the cable bunch to a predetermined connector pin in the second electrical connector, a locking device including a code unit interposed between the cable bunch and the electrically operated device to selectively break and connect a connection between at least one conductor incoming from the cable bunch to the code unit and a corresponding number of conductors outgoing from the code unit to the second electrical connector, so that when electrically connecting the conductors incoming to and outgoing from the code unit incoming conductors of different respective colors or color combinations are connected to outgoing conductors of other respective colors or color combinations, thereby to obtain a predetermined mixture of colors or color combinations of the incoming and outgoing conductors upstream and downstream of the code unit, and so that the incoming conductors with the first electrical connector are electrically connected to predetermined correct connector pins in the second electrical connector to permit transmission of current or signals from the incoming conductors to the electrically operated device, and wherein the code unit includes an electronic lock for effecting correct conductor connections between the incoming conductors to the code unit and the outgoing conductors from the code unit when the user causes the electronic lock to be in an opened condition.

2. Apparatus according to claim 1, wherein the code unit includes relays controlled by the electronic lock.

3. Apparatus according to claim 1, wherein the code unit includes a processor controlled by the electronic lock.

4. Apparatus according to claim 1, wherein the electronic lock includes means for delivering a code to the electronic lock for comparison with a code stored in the lock; and wherein the electronic lock operates the code unit when agreement is found between the delivered code and the stored code.

5. Apparatus according to claim 1, wherein conductors present in the code unit have the same color.

6. Apparatus according to claim 1, including code entry means operatively connected with the electronic lock for providing an input code to the electronic lock, wherein the electronic lock includes a stored code and means for comparing the input code with the stored code to provide a signal to unlock the electronic lock when the input code and the stored code are in agreement.

7. Apparatus according to claim 6, wherein the code entry means is a keyboard for manually entering an input code.

8. Apparatus according to claim 6, wherein the code entry means includes a card reader for reading a card that carries an input code.

9. Apparatus according to claim 1, wherein each of the conductors outgoing from the code unit has an identical appearance.

* * * * *